(12) United States Patent
Hsu et al.

(10) Patent No.: US 8,274,594 B2
(45) Date of Patent: *Sep. 25, 2012

(54) IMAGE-CAPTURING MODULE FOR SIMPLIFYING OPTICAL COMPONENT

(75) Inventors: Chi-Hsing Hsu, Taipei (TW); Chin-Chien Chen, Taipei (TW)

(73) Assignee: Azurewave Technologies, Inc., Xindian, Taipei (TW)

(*) Notice: Subject to any disclaimer, the term of this patent is extended or adjusted under 35 U.S.C. 154(b) by 262 days.

This patent is subject to a terminal disclaimer.

(21) Appl. No.: 12/686,915

(22) Filed: Jan. 13, 2010

(65) Prior Publication Data

US 2011/0058092 A1  Mar. 10, 2011

(30) Foreign Application Priority Data

Sep. 9, 2009 (TW) ................ 98216634 U

(51) Int. Cl.
| | |
|---|---|
| H04N 5/225 | (2006.01) |
| G06K 9/00 | (2006.01) |
| G05B 19/00 | (2006.01) |
| G05B 23/00 | (2006.01) |
| G06F 7/00 | (2006.01) |
| G06F 7/04 | (2006.01) |
| G08B 29/00 | (2006.01) |
| G08C 19/00 | (2006.01) |
| H04Q 9/00 | (2006.01) |

(52) U.S. Cl. ........ 348/340; 382/115; 382/116; 340/5.82; 340/5.83

(58) Field of Classification Search .......... 348/335–369; 340/5.82–5.83; 382/115–116
See application file for complete search history.

(56) References Cited

U.S. PATENT DOCUMENTS

| | | | | |
|---|---|---|---|---|
| 4,894,677 | A * | 1/1990 | Bourcier et al. | 396/113 |
| 5,109,427 | A * | 4/1992 | Yang | 382/127 |
| 5,233,404 | A * | 8/1993 | Lougheed et al. | 356/71 |
| 6,700,606 | B1 * | 3/2004 | Borza | 348/218.1 |
| 7,474,773 | B2 * | 1/2009 | Chau | 382/124 |
| 8,077,929 | B2 * | 12/2011 | Heidt | 382/115 |
| 8,077,934 | B2 * | 12/2011 | Fenrich et al. | 382/124 |
| 8,164,446 | B2 * | 4/2012 | Prytkov et al. | 340/540 |
| 2001/0050765 | A1 * | 12/2001 | Antonelli et al. | 356/71 |
| 2008/0107309 | A1 * | 5/2008 | Cerni | 382/115 |
| 2008/0117292 | A1 * | 5/2008 | Orihara et al. | 348/76 |
| 2008/0204551 | A1 * | 8/2008 | O'Connell et al. | 348/79 |

* cited by examiner

*Primary Examiner* — Kelly L Jerabek
*Assistant Examiner* — Pritham Prabhakher
(74) *Attorney, Agent, or Firm* — Muncy, Geissler, Olds & Lowe, PLLC

(57) ABSTRACT

An image-capturing module for simplifying optical component includes a first substrate unit, an image-capturing unit, an optical imaging unit, a second substrate unit, a light-emitting unit and a cover unit. The second substrate unit is disposed on the outer surface of the optical imaging unit and electrically connected to the first substrate unit. The light-emitting unit has a light-emitting element electrically disposed on the second substrate unit. The cover unit has a reflective layer formed on an inner surface thereof. Therefore, the light beams generated by the light-emitting element are reflected by the reflective layer to form first reflected light beams projected onto the object, then the first reflected light beams are reflected by the object to form second reflected light beams projected onto the optical imaging unit, and then the second reflected light beams pass through the optical imaging unit and project onto the image-capturing unit.

11 Claims, 8 Drawing Sheets

IMAGE-CAPTURING MODULE FOR SIMPLIFYING OPTICAL COMPONENT

BACKGROUND OF THE INVENTION

1. Field of the Invention

The present invention relates to an image-capturing module, in particular, to an image-capturing module for simplifying optical component.

2. Description of Related Art

A personal fingerprint is a unique bio-feature different from those of others. When used as a personal secret code, it is extremely secure. Because of the popularity of electronic device and the increase of their storage capacities, the protection for personal data stored therein becomes increasingly important. Using a fingerprint for unlocking electronic device or as a secret code can make management of personal data more efficient. Electronic device such as a mobile phone, a computer host, and various kinds of computer peripherals can make use of a fingerprint scanning device to capture a user's fingerprint for identity confirmation. After the fingerprint image in the fingerprint scanning device is converted into digital fingerprint information, it is easy to transmit the digital fingerprint information to a controller in the electronic device to exploit fully the effect of fingerprint identification.

Referring to FIG. 1, the related art provides an image-capturing module including a PCB P, an image sensor S electrically disposed on the PCB P, an LED D electrically disposed on the PCB P, a condensing lens G disposed above the image sensor S, and a light-guiding element T disposed above the LED D. The image capturing process of the related art is shown as follows: (1) light beams L generated by the LED D are guided by the light-guiding element T to form a projecting light beams L' that project onto the object F above the condensing lens G; next (2) the projecting light beams L' are reflected by the object F to form reflecting light beams L" that project onto the condensing lens G; and then (3) the reflecting light beams L" pass through the condensing lens G and project onto the image sensor S in order to capture the image information of one surface of the object F.

SUMMARY OF THE INVENTION

In view of the aforementioned issues, the present invention provides an image-capturing module for simplifying optical component. For example, the light-guiding element of the related art can be omitted in the present invention in order to simplify optical component.

To achieve the above-mentioned objectives, the present invention provides an image-capturing module for simplifying optical component, including: a first substrate unit, an image-capturing unit, an optical imaging unit, a cover unit, a second substrate unit and a light-emitting unit. The image-capturing unit has at least one image-capturing element electrically disposed on the first substrate unit. The optical imaging unit is disposed on the first substrate unit and covering the image-capturing unit, and the optical imaging unit has at least one insulative layer formed on an outer surface thereof. The cover unit is disposed on the first substrate unit and covering the optical imaging unit. The cover unit has at least one inclined surface formed on an inner surface thereof and a light-transmitting element disposed on a top surface thereof and above the optical imaging unit, and an object is disposed on the light-transmitting element. The second substrate unit is disposed on the inclined surface of the cover unit and electrically connected to the first substrate unit. The light-emitting unit has at least one light-emitting element electrically disposed on the second substrate unit.

Therefore, light beams generated by the at least one light-emitting element are reflected by the at least one reflective layer to form first reflected light beams projected onto the object on the light-transmitting element, then the first reflected light beams are reflected by the object to form second reflected light beams projected onto the light-condensing element, and then the second reflected light beams pass through the optical imaging unit and project onto the image-capturing unit.

To achieve the above-mentioned objectives, the present invention provides an image-capturing module for simplifying optical component, including: a substrate unit, an image-capturing unit, an optical imaging unit, a light-emitting unit and a cover unit. The image-capturing unit has at least one image-capturing element electrically disposed on the substrate unit. The optical imaging unit is disposed on the substrate unit and covering the image-capturing unit. The optical imaging unit has at least one inclined surface formed on an outer surface thereof, and one end of the substrate is electrically disposed on the at least one inclined surface. The light-emitting unit has at least one light-emitting element electrically disposed on the end of the substrate unit and above the at least one inclined surface. The cover unit is disposed on the substrate unit and covering the optical imaging unit and the light-emitting unit. The cover unit has at least one reflective layer formed on an inner surface thereof and a light-transmitting element disposed on a top surface thereof and above the optical imaging unit, and an object is disposed on the light-transmitting element.

Therefore, light beams generated by the at least one light-emitting element are reflected by the at least one reflective layer to form first reflected light beams projected onto the object on the light-transmitting element, then the first reflected light beams are reflected by the object to form second reflected light beams projected onto the light-condensing element, and then the second reflected light beams pass through the optical imaging unit and project onto the image-capturing unit.

To achieve the above-mentioned objectives, the present invention provides an image-capturing module for simplifying optical component, including: a first substrate unit, an image-capturing unit, an optical imaging unit, a second substrate unit, a light-emitting unit and a cover unit. The image-capturing unit has at least one image-capturing element electrically disposed on the substrate unit. The optical imaging unit is disposed on the substrate unit and covering the image-capturing unit. The optical imaging unit has at least one inclined surface formed on an outer surface thereof, and one end of the substrate is electrically disposed on the at least one inclined surface. The light-emitting unit has at least one light-emitting element electrically disposed on the end of the substrate unit and above the at least one inclined surface. The cover unit is disposed on the substrate unit and covering the optical imaging unit and the light-emitting unit. The cover unit has a light-transmitting element disposed on a top surface thereof and above the optical imaging unit and an object is disposed on the light-transmitting element, and light beams generated by the at least one light-emitting element is projected directly onto the light-transmitting element.

Therefore, the light beams are reflected by the object to form reflected light beams projected onto the optical imaging unit, and then the reflected light beams pass through the optical imaging unit and project onto the image-capturing unit.

Hence, the present invention can capture the image information of one surface of the object by matching the reflective layer and the light-emitting unit, so that the light-guiding element of the related art can be omitted in the present invention in order to simplify optical component.

In order to further understand the techniques, means and effects the present invention takes for achieving the prescribed objectives, the following detailed descriptions and appended drawings are hereby referred, such that, through which, the purposes, features and aspects of the present invention can be thoroughly and concretely appreciated; however, the appended drawings are provided solely for reference and illustration, without any intention that they be used for limiting the present invention.

DETAILED DESCRIPTION OF THE PREFERRED EMBODIMENTS

Figure 1:
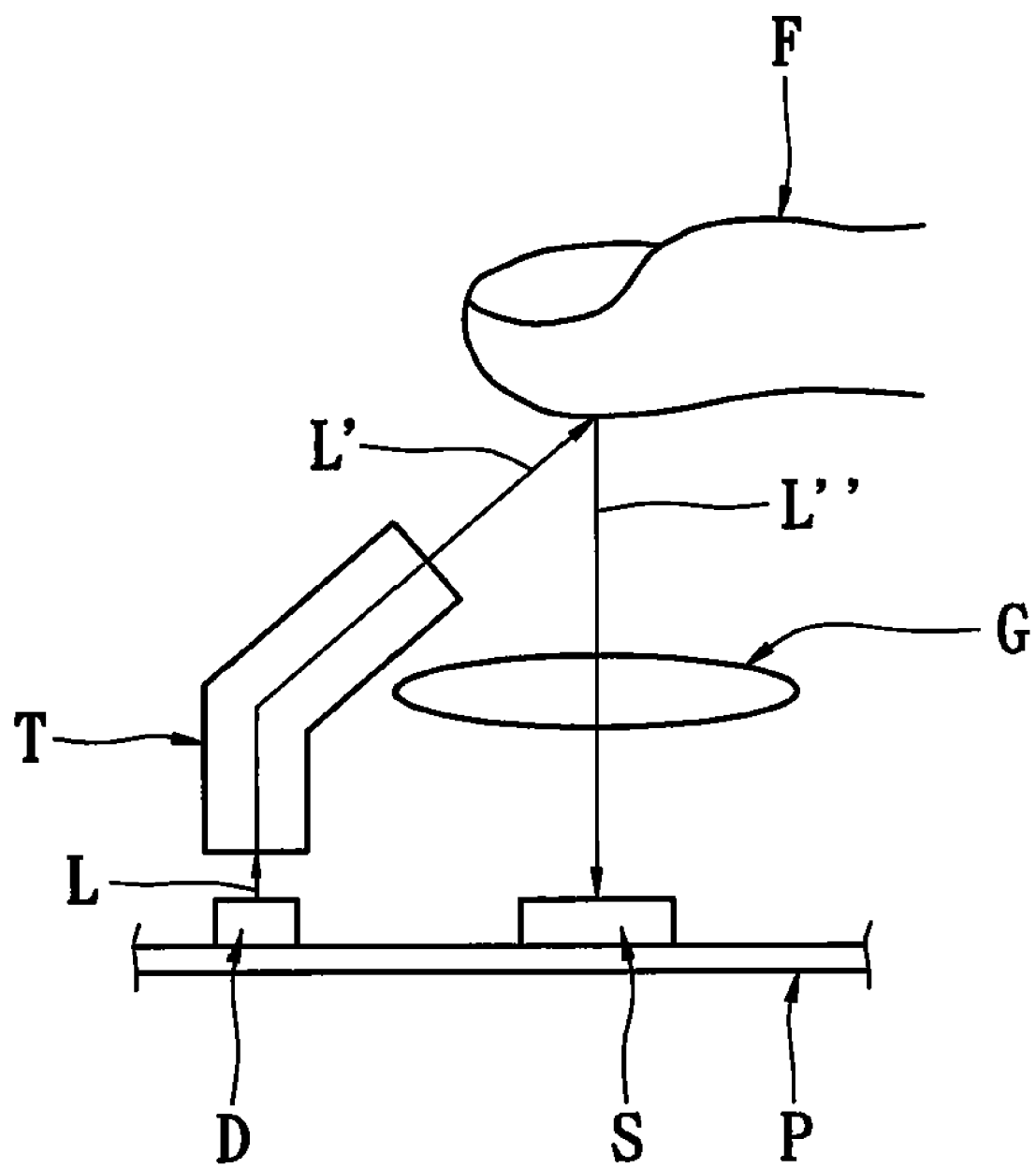
FIG. 1 is a schematic, schematic view of the image-capturing module according to the related art.
Figure 2:
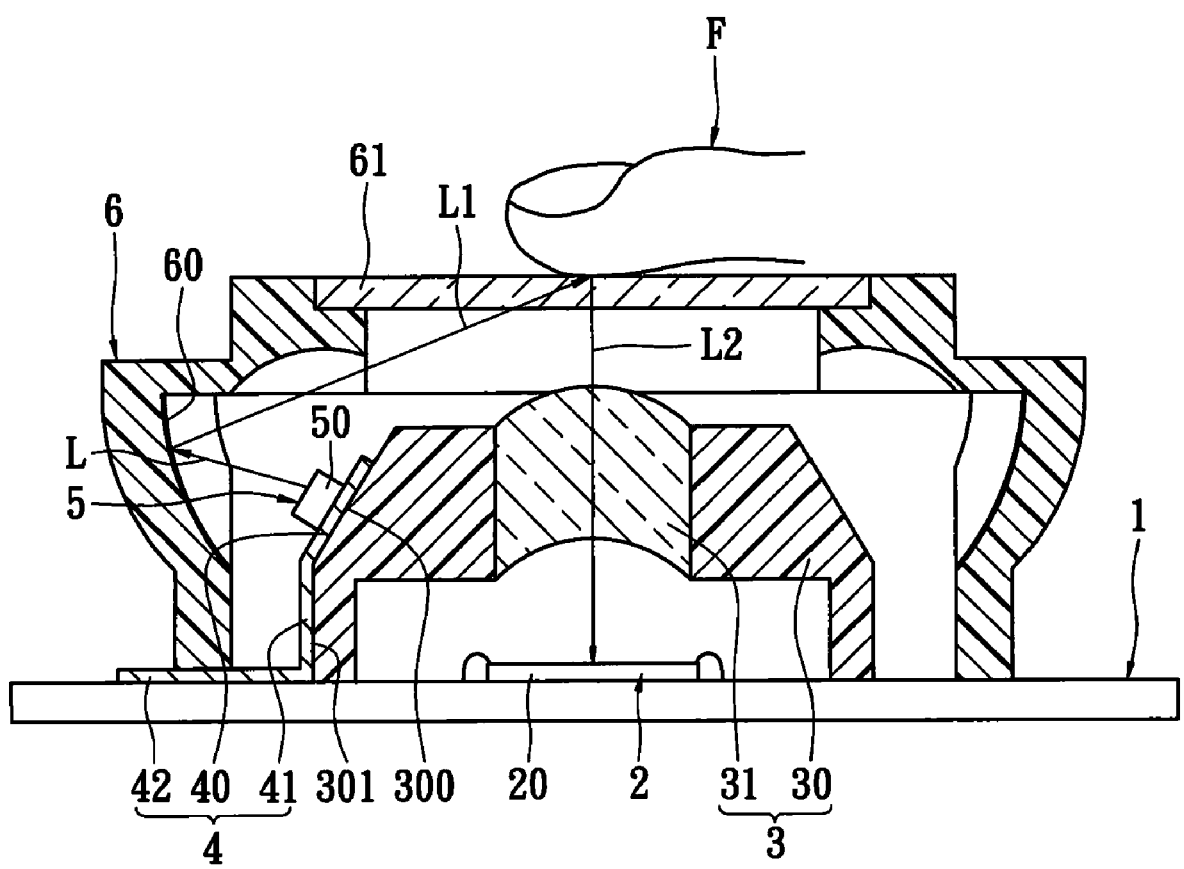
FIG. 2 is a cross-sectional, schematic view of the image-capturing module according to the first embodiment of the present invention.

Referring to FIG. 2, the first embodiment of the present invention provides an image-capturing module for simplifying optical component, including: a first substrate unit 1, an image-capturing unit 2, an optical imaging unit 3, a second substrate unit 4, a light-emitting unit 5 and a cover unit 6.

The first substrate unit 1 and the second substrate unit 4 both can be printed circuit boards. However, the above-mentioned definition of the first substrate unit 1 and the second substrate unit 4 is just an example. Any substrate with conductive tracks can be applied to the present invention.

Moreover, the image-capturing unit 2 has at least one image-capturing element 20 electrically disposed on the first substrate unit 1, so that the number of the image-capturing element 20 can be adjustable according to different requirements. The image-capturing element 20 can be an image sensor, and the image-capturing element 20 can electrically connect to analysis software in computer in order to read image information that is captured by the image-capturing element 20.

Furthermore, the optical imaging unit 3 with anti stray light function is disposed on the first substrate unit 1 and covers the image-capturing unit 2. In the first embodiment, the optical imaging unit 3 has a shading body 30 (for example, a shading layer is coated on the external surface of the shading body 30 in order to achieve anti stray light function) and a light-condensing element 31 jointed with the shading body 30 and disposed above the image-capturing unit 2. The light-condensing element 31 can be a condensing lens for condensing light beams, and the shading body 30 and the light-condensing element 31 can be integrally formed in one piece. In addition, the shading body 30 has at least one inclined surface 300 formed on an outer surface thereof, and the inclined surface 300 can be an inclined plane or an inclined curve, so that the light-emitting unit 5 can be a chemical phosphor layer attached to the inclined surface 300. The shading body 30 has at least one extending plane 301 formed on the outer surface thereof and extended downwards from the inclined surface 300 to the first substrate unit 1. Hence, the light beams are projected onto the image-capturing unit 2 along a predetermined path by using the optical imaging unit 3 (it means the optical imaging unit 3 can shade other external stray light), so that the image-capturing unit 2 can obtain correct image information.

Moreover, the second substrate unit 4 is disposed on the outer surface of the shading body 30 and electrically connected to the first substrate unit 1. For example, the second substrate unit 4 has an inclined substrate 40 disposed on the inclined surface 300 of the shading body 30. In addition, the second substrate unit 4 has an extending substrate 41 extended downwards from the inclined substrate 40 and disposed on the extending plane 301 and a plane substrate 42 bent outwards from the extending substrate 41 and electrically connected to the first substrate unit 1.

Besides, the light-emitting unit 5 has at least one light-emitting element 50 electrically disposed on the inclined substrate 40 of the second substrate unit 4. For example, the light-emitting element 40 can be an LED (Light Emitting Diode). However, the above-mentioned definition of the light-emitting element 40 is just an example in the first embodiment, and any type of light-emitting element can be applied to the present invention.

Moreover, the cover unit 6 is disposed on the first substrate unit 1 and covers the optical imaging unit 3, the second substrate unit 4 and the light-emitting unit 5. The cover unit 6 has at least one reflective layer 60 formed on an inner surface thereof and a light-transmitting element 61 disposed on a top surface thereof and above the light-condensing element 31, and the object F is disposed on the light-transmitting element 61 such as transparent glass or plastic. In other words, the sensing surface of the object F (such as fingerprint of finger) can be disposed on the light-transmitting element 61 to be sensed. In addition, the reflective layer 60 can be a reflective element adhered to the inner surface of the cover unit 6 or a reflective coated film coated on the inner surface of the cover unit 6. In addition, the light-transmitting element 61 and the condensing element 31 may be connected to each other or be integrally combined to form one piece.

Therefore, the light beams L generated by the light-emitting element 50 are reflected by the reflective layer 60 to form first reflected light beams L1 projected onto the object F on the light-transmitting element 61, then the first reflected light beams L1 are reflected by the object F to form second reflected light beams L2 projected onto the light-condensing element 31, and then the second reflected light beams L2 pass through the light-condensing element 31 and project onto the image-capturing unit 2 in order to capture the image information of one surface of the object F.

Figure 3:
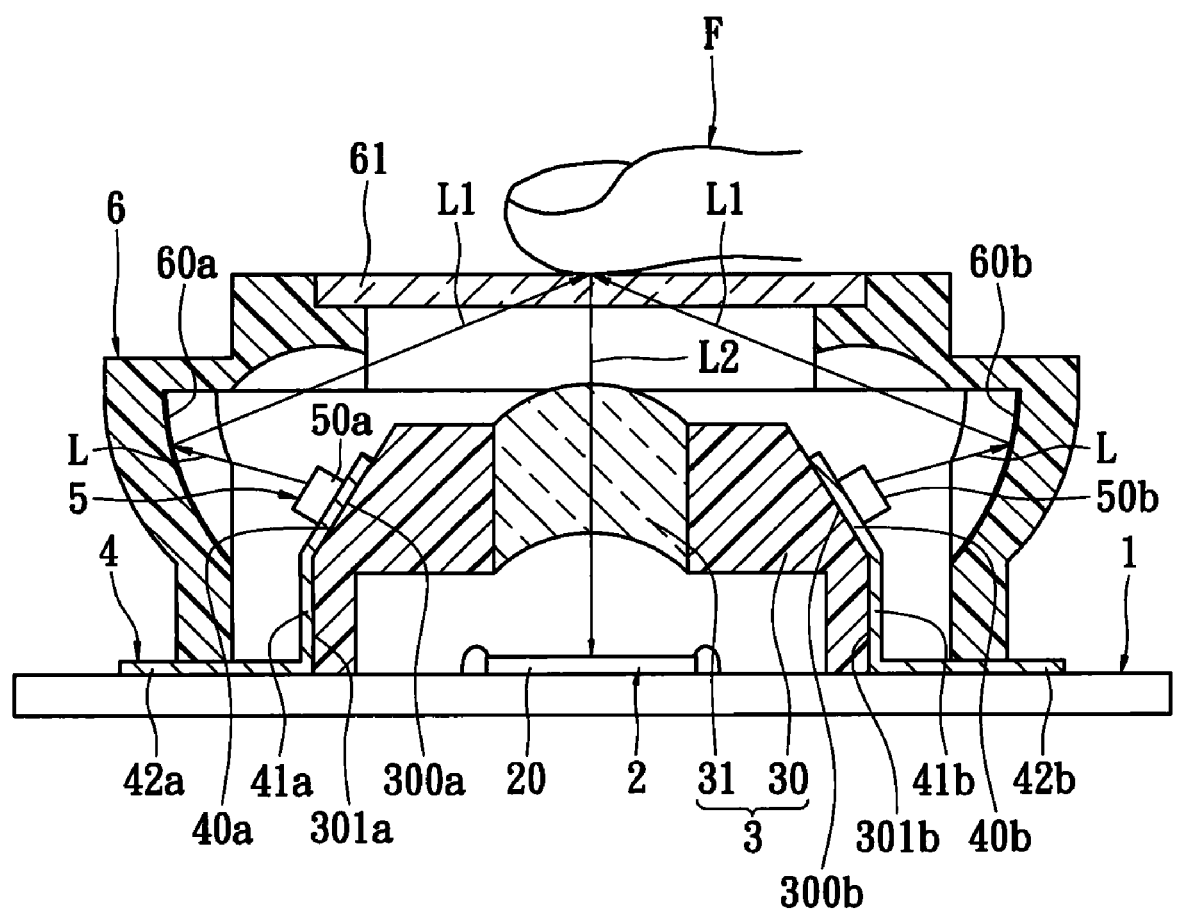
FIG. 3 is a cross-sectional, schematic view of the image-capturing module according to the second embodiment of the present invention.

Referring to FIG. 3, the second embodiment of the present invention provides an image-capturing module for simplifying optical component, including: a first substrate unit 1, an image-capturing unit 2, an optical imaging unit 3, a second substrate unit 4, a light-emitting unit 5 and a cover unit 6.

The difference between the second embodiment and the first embodiment is that: in the second embodiment, the shading body 30 has at least one first inclined surface 300a and at least one second inclined surface 300b both formed on an outer surface thereof. The second substrate unit 4 has a first inclined substrate 40a disposed on the first inclined surface 300a of the shading body 30a and a second inclined substrate 40b disposed on the second inclined surface 300b of the shading body 30. The light-emitting unit 5 has at least one first light-emitting element 50a electrically disposed on the first inclined substrate 40a of the second substrate unit 4 and at least one second light-emitting element 50b electrically disposed on the second inclined substrate 40b of the second substrate unit 4. The cover unit 6 has at least one first reflective layer 60a and at least one second reflective layer 60b both formed on an inner surface thereof.

Moreover, the shading body 30 has at least one first extending plane 301a formed on the outer surface thereof and extended downwards from the first inclined surface 300a to the first substrate unit 1, and the second substrate unit 4 has a first extending substrate 41a extended downwards from the first inclined substrate 40a and disposed on the first extending plane 301a and a first plane substrate 42a bent outwards from the first extending substrate 41a and electrically connected to the first substrate unit 1. In addition, the shading body 30 has at least one second extending plane 301b formed on the outer surface thereof and extended downwards from the second inclined surface 300b to the first substrate unit 1, and the second substrate unit 4 has a second extending substrate 41b extended downwards from the second inclined substrate 40b and disposed on the second extending plane 301b and a second plane substrate 42b bent outwards from the second extending substrate 41b and electrically connected to the first substrate unit 1.

Furthermore, the first light-emitting element 50a and the second light-emitting element 50b can be light emitting diodes. In addition, the first reflective layer 60a is a first reflective element adhered to the inner surface of the cover unit 6 or a first reflective coated film coated on the inner surface of the cover unit 6, and the second reflective layer 60b is a second reflective element adhered to the inner surface of the cover unit 6 or a second reflective coated film coated on the inner surface of the cover unit 6. In addition, the light-transmitting element 61 and the condensing element 31 may be connected to each other or be integrally combined to form one piece.

Therefore, light beams L generated by the first light-emitting element 50a and the second light-emitting element 50b are reflected by the first reflective layer 60a and the second reflective layer 60b to form two sets of first reflected light beams L1 projected onto the object F on the light-transmitting element 61, then the two sets of the first reflected light beams L1 are reflected by the object F to form convergent second reflected light beams L2 projected onto the light-condensing element 31, and then the second reflected light beams L2 pass through the light-condensing element 31 and project onto the image-capturing unit 2 in order to capture the image information of one surface of the object F.

Figure 4A:
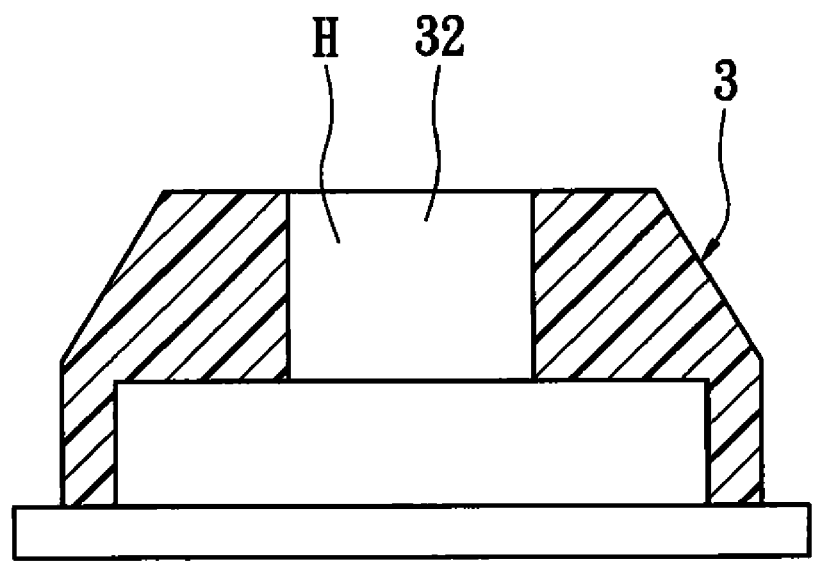
FIG. 4A is a cross-sectional, schematic view of one type of the optical imaging unit according to the present invention.
Figure 4B:
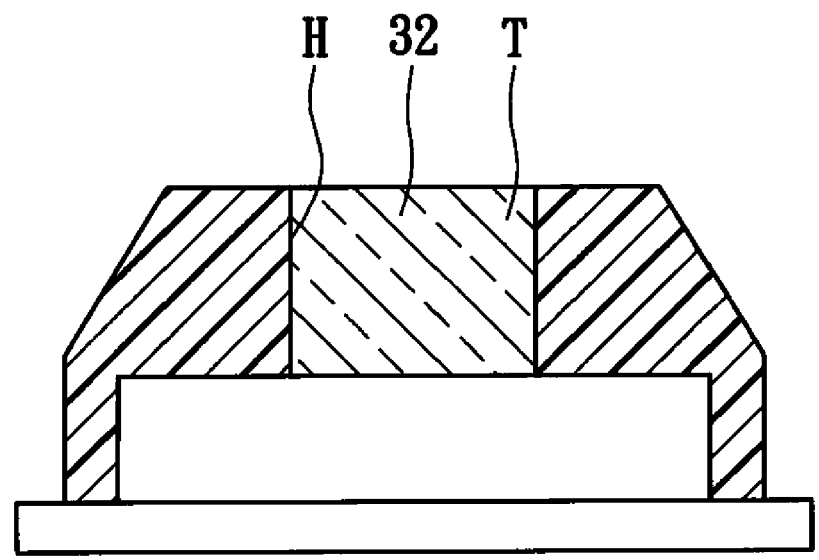
FIG. 4B is a cross-sectional, schematic view of another type of the optical imaging unit according to the present invention.

Referring to FIGS. 4A and 4B, the light-condensing element 31 can be replaced by the light-transmitting region 32 of the optical imaging unit 3. For example, the light-transmitting region 32 can be a hole H as shown in the FIG. 4A, or the light-transmitting region 32 can be composed of a hole H and a light-transmitting body T filled into the hole H. Hence, the second reflected light beams L2 can pass through light-transmitting region 32 of the optical imaging unit 3 and project onto the image-capturing unit 2 in order to capture the image information of one surface of the object F.

Figure 5:
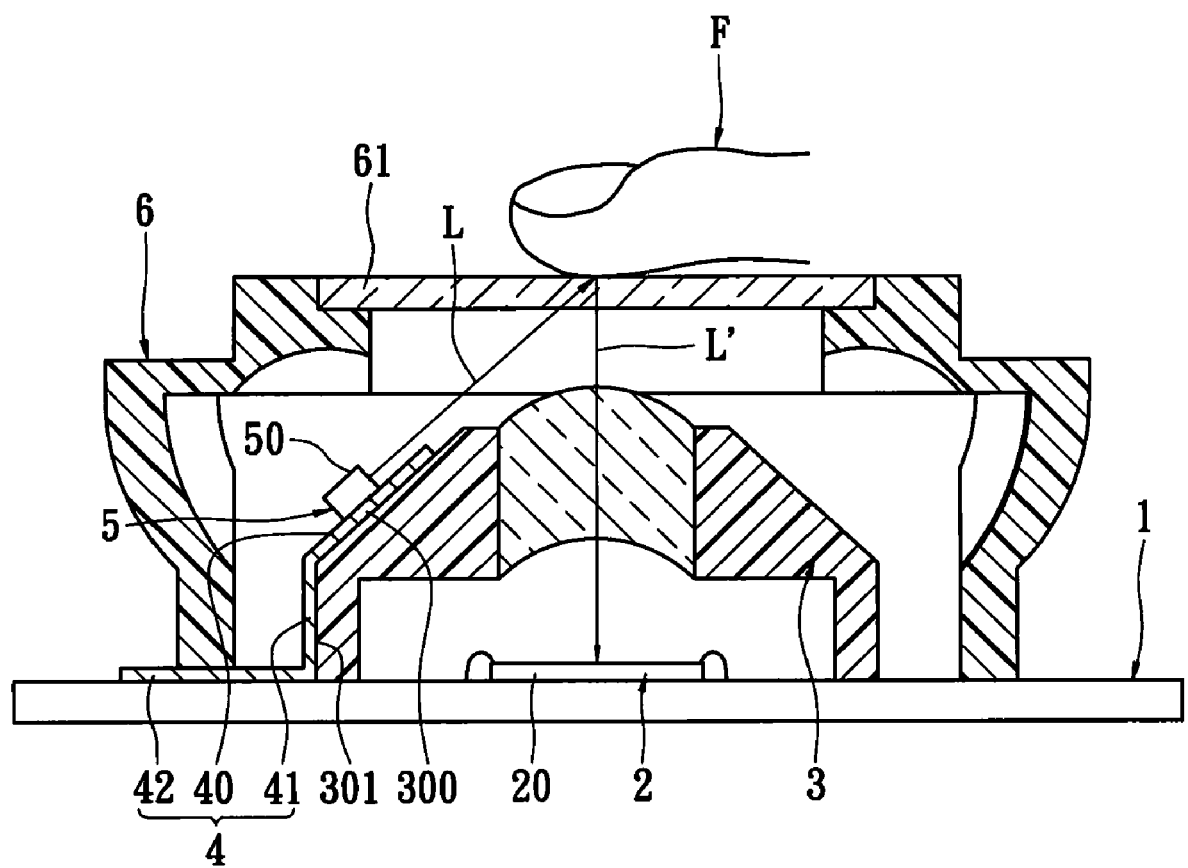
FIG. 5 is a cross-sectional, schematic view of the image-capturing module according to the third embodiment of the present invention.

Referring to FIG. 5, the difference between the third embodiment and the above-mentioned embodiments is that: in the third embodiment, the light beams L generated by the light-emitting element 50 are projected directly onto the light-transmitting element 61. Therefore, the light beams L are reflected by the object F to form reflected light beams L' projected onto the optical imaging unit 3, and then the reflected light beams L' pass through the optical imaging unit 3 and project onto the image-capturing unit 2. In addition, the light-transmitting element 61 and the condensing element 31 may be connected to each other or be integrally combined to form one piece.

Figure 6:
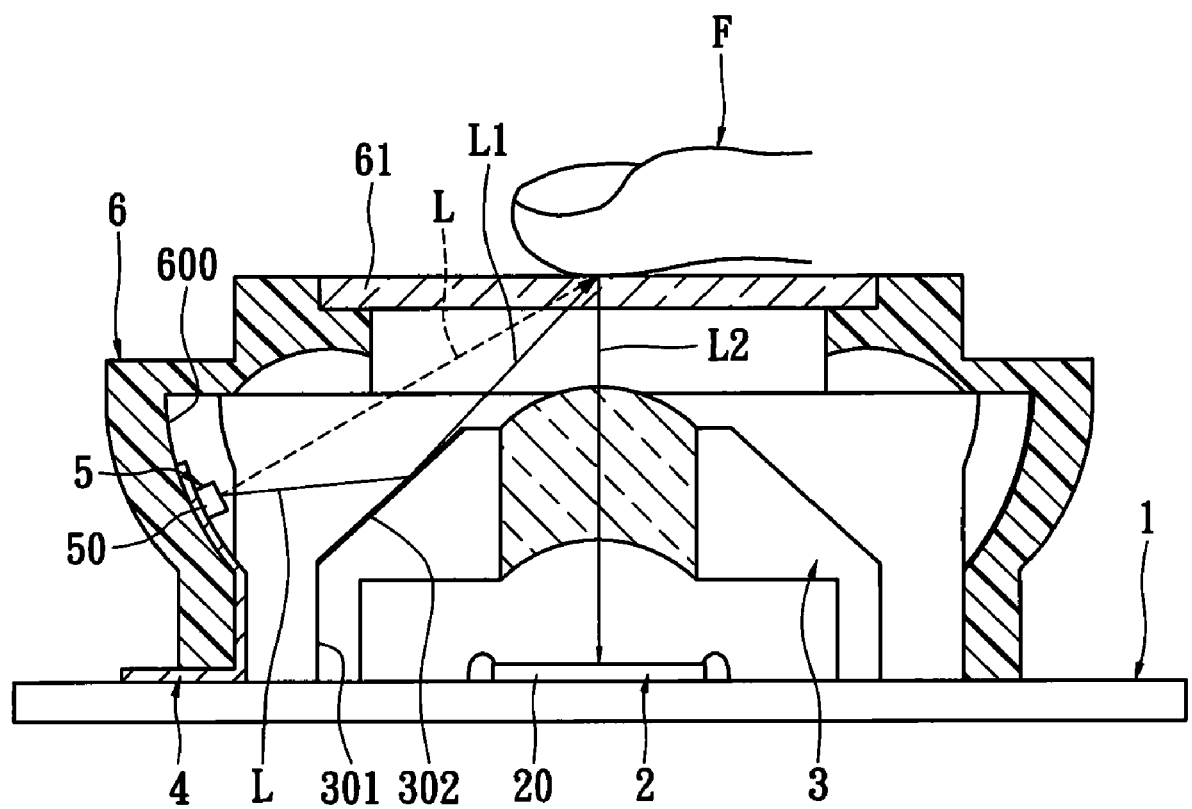
FIG. 6 is a cross-sectional, schematic view of the image-capturing module according to the fourth embodiment of the present invention.

Referring to FIG. 6, the difference between the fourth embodiment and the first embodiment is that: in the fourth embodiment, the optical imaging unit 3 has at least one reflective layer 302 formed on an outer surface thereof. The cover unit 6 has at least one inclined surface 600 formed on an inner surface thereof. The second substrate unit 4 is disposed on the inclined surface 600 of the cover unit 6 and is electrically connected to the first substrate unit 1. Therefore, the light beams L generated by the light-emitting element 50 are reflected by the reflective layer 302 to form first reflected light beams L1 projected onto the object F on the light-transmitting element 61 or are directly projected onto the object F on the light-transmitting element 61 (shown as the dotted line in FIG. 6), then the first reflected light beams L1 are reflected by the object F to form second reflected light beams L2 projected onto the optical imaging unit 3, and then the second reflected light beams L2 pass through the optical imaging unit 3 and project onto the image-capturing unit 2. In addition, the light-transmitting element 61 and the condensing element 31 may be connected to each other or be integrally combined to form one piece.

Figure 7:
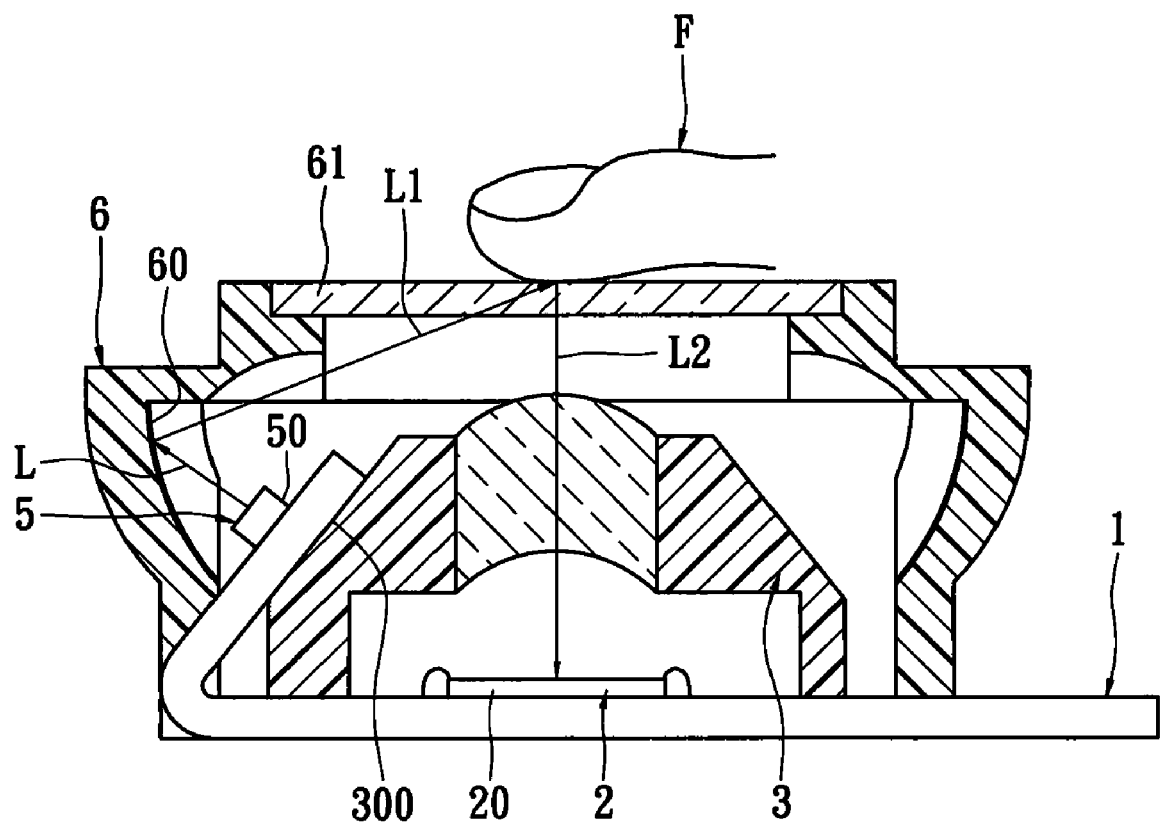
FIG. 7 is a cross-sectional, schematic view of the image-capturing module according to the fifth embodiment of the present invention.

Referring to FIG. 7, the fifth embodiment of the present invention provides an image-capturing module for simplifying optical component, including: a substrate unit 1, an image-capturing unit 2, an optical imaging unit 3, a light-emitting unit 5 and a cover unit 6.

Moreover, the image-capturing unit 2 has at least one image-capturing element 20 electrically disposed on the substrate unit 1. The optical imaging unit 3 is disposed on the substrate unit 1 and covers the image-capturing unit 2. The optical imaging unit 3 has at least one inclined surface 300 formed on an outer surface thereof, and one end of the substrate unit 1 is electrically disposed on the inclined surface 300. The light-emitting unit 5 has at least one light-emitting element 50 electrically disposed on one end of the substrate unit 1 and above the inclined surface 300. The cover unit 6 is disposed on the substrate unit 1 and covers the optical imaging unit 3 and the light-emitting unit 5. The cover unit 6 has at least one reflective layer 60 formed on an inner surface thereof and a light-transmitting element 61 disposed on a top surface thereof and above the optical imaging unit 3, and the object F is disposed on the light-transmitting element 61. In addition, the light-transmitting element 61 and the condensing element 31 may be connected to each other or be integrally combined to form one piece.

Therefore, the light beams L generated by the light-emitting element 50 are reflected by the reflective layer 60 to form first reflected light beams L1 projected onto the object F on the light-transmitting element 61, then the first reflected light beams L1 are reflected by the object F to form second reflected light beams L2 projected onto the optical imaging unit 3, and then the second reflected light beams L2 pass through the optical imaging unit 3 and project onto the image-capturing unit 2 in order to capture the image information of one surface of the object F.

Figure 8:
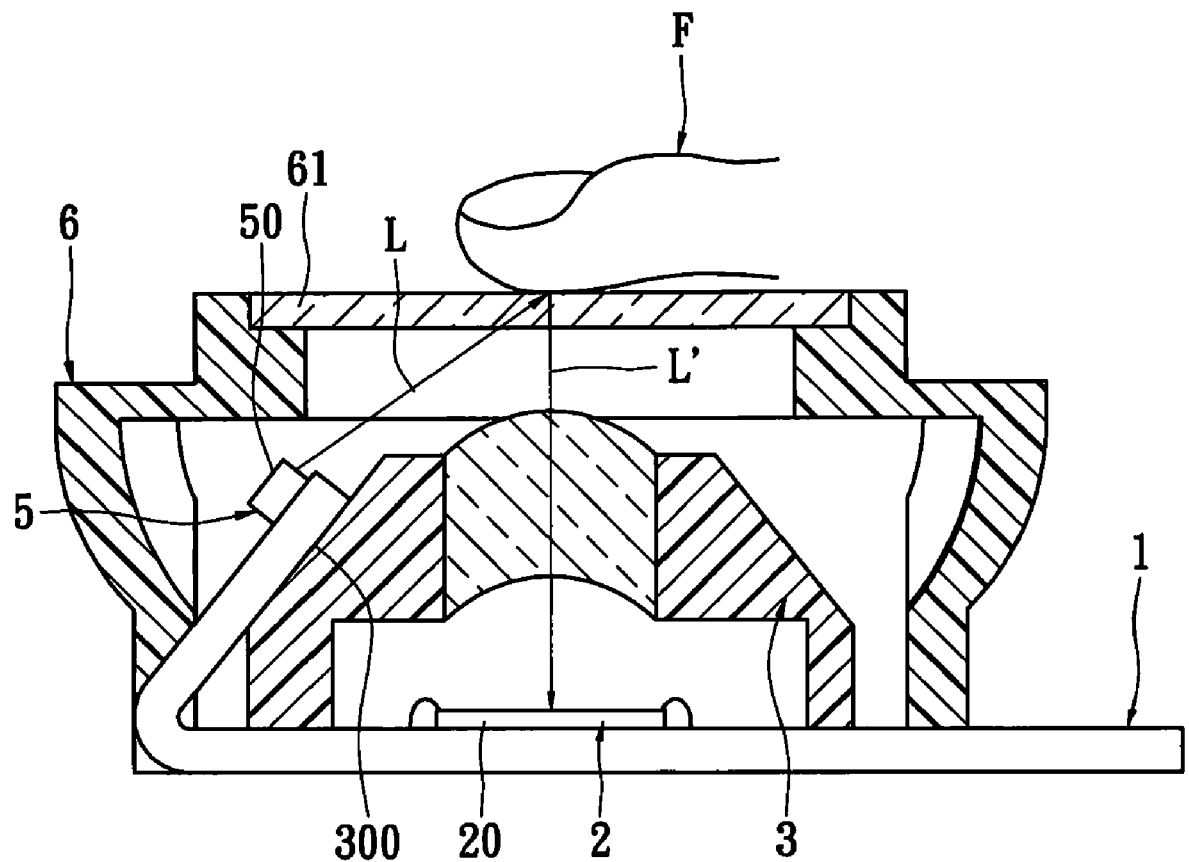
FIG. 8 is a cross-sectional, schematic view of the image-capturing module according to the sixth embodiment of the present invention.

Referring to FIG. 8, the difference between the sixth embodiment and the fifth embodiment is that: in the sixth embodiment, the light beams L generated by the light-emitting element 50 can be projected directly onto the object F on the light-transmitting element 61. Hence, the light beams L are reflected by the object F to form reflected light beams L' projected onto the optical imaging unit 3, and then the reflected light beams L' pass through the optical imaging unit 3 and project onto the image-capturing unit 2. In addition, the light-transmitting element 61 and the condensing element 31 may be connected to each other or be integrally combined to form one piece.

Figure 9:
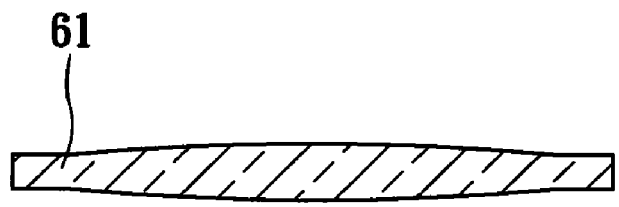
FIG. 9 is a cross-sectional, schematic view of the light-transmitting element according to the present invention.

Referring to FIG. 9, the light-transmitting element 61 has a light-condensing function such as a lens. In other words, the light-transmitting element 61 may be design as a glass or a lens.

In conclusion, the present invention can capture the image information of one surface of the object by matching the reflective layer and the light-emitting unit, so that the light-guiding element of the related art can be omitted in the present invention in order to simplify optical component.

The above-mentioned descriptions merely represent solely the preferred embodiments of the present invention, without any intention or ability to limit the scope of the present invention which is fully described only within the following claims. Various equivalent changes, alterations or modifications based on the claims of present invention are all, consequently, viewed as being embraced by the scope of the present invention.

What is claimed is:

1. An image-capturing module comprising:
   a first substrate unit;
   an image-capturing unit including an image-capturing element disposed on the first substrate unit and electrically connected to the first substrate unit;
   an optical imaging unit disposed on the first substrate unit to cover the image-capturing unit, wherein the optical imaging unit has at least one first inclined surface formed on an outer surface thereof and at least one reflective layer disposed on the at least one first inclined surface;
   a cover unit disposed on the first substrate unit to cover the optical imaging unit, wherein the cover unit includes a light-transmitting element disposed above the optical imaging unit, and the cover unit has at least one second inclined surface formed on an inner surface thereof;
   a second substrate unit disposed on the at least one second inclined surface of the cover unit and electrically connected to the first substrate unit; and
   a light-emitting unit including at least one light-emitting element disposed on the second substrate unit and electrically connected to the second substrate unit for generating light beams;
   wherein an object is disposed on the light-transmitting element, the light beams generated by the at least one light-emitting element are projected onto the at least one reflective layer and reflected by the at least one reflective layer to form first reflected light beams, the first reflected light beams are projected onto the object through the light-transmitting element and reflected by the object to form second reflected light beams, and then the second reflected light beams are projected onto the image-capturing element through the optical imaging unit.

2. The image-capturing module according to claim 1, wherein the first substrate unit and the second substrate unit are printed circuit boards, and the image-capturing element is an image sensor.

3. The image-capturing module according to claim 1, wherein the light-emitting element is a light emitting diode.

4. The image-capturing module according to claim 1, wherein the reflective layer is a reflective element adhered to the inner surface of the cover unit or a reflective coated film coated on the inner surface of the cover unit.

5. An image-capturing module comprising:
   a substrate unit having a bended end portion;
   an image-capturing unit including an image-capturing element disposed on the substrate unit and electrically connected to the substrate unit;
   an optical imaging unit disposed on the substrate unit to cover the image-capturing unit, wherein the optical imaging unit has at least one first inclined surface formed on an outer surface thereof, and the bended end portion of the substrate unit is bent and disposed on the at least one first inclined surface of the optical imaging unit;
   a light-emitting unit including at least one light-emitting element disposed on the bended end portion of the substrate unit and electrically connected to the bended end portion of the substrate unit for generating light beams; and
   a cover unit disposed on the substrate unit to cover the optical imaging unit and the light-emitting unit, wherein the cover unit includes a light-transmitting element disposed above the optical imaging unit, and the cover unit has at least one second inclined surface formed on an inner surface thereof and at least one reflective layer disposed on the at least one second inclined surface;
   wherein an object is disposed on the light-transmitting element, the light beams generated by the at least one light-emitting element are projected onto the at least one reflective layer and reflected by the at least one reflective layer to form first reflected light beams, the first reflected light beams are projected onto the object through light-transmitting element and reflected by the object to form second reflected light beams, and then the second reflected light beams are projected onto the image-capturing unit through the optical imaging unit.

6. The image-capturing module according to claim 5, wherein the substrate unit is a printed circuit board, and the image-capturing element is an image sensor.

7. The image-capturing module according to claim 5, wherein the light-emitting element is a light emitting diode.

8. The image-capturing module according to claim 5, wherein the reflective layer is a reflective element adhered to the inner surface of the cover unit or a reflective coated film coated on the inner surface of the cover unit.

9. An image-capturing module comprising:
   a substrate unit having a bended end portion;
   an image-capturing unit including an image-capturing element disposed on the substrate unit and electrically connected to the substrate unit;
   an optical imaging unit disposed on the substrate unit to cover the image-capturing unit, wherein the optical imaging unit has at least one inclined surface formed on an outer surface thereof, and the bended end portion of the substrate unit is bent and disposed on the at least one inclined surface of the optical imaging unit;

a light-emitting unit including at least one light-emitting element disposed on the bended end portion of the substrate unit and electrically connected to the bended end portion of the substrate unit for generating light beams; and a cover unit disposed on the substrate unit to cover the optical imaging unit and the light-emitting unit, wherein the cover unit includes a light-transmitting element disposed above the optical imaging unit;

wherein an object is disposed on the light-transmitting element, the light beams generated by the at least one light-emitting element are projected onto the object through light-transmitting element and reflected by the object to form reflected light beams, and then the reflected light beams are projected onto the image-capturing unit through the optical imaging unit.

10. The image-capturing module according to claim 9, wherein the substrate unit is a printed circuit board, and the image-capturing element is an image sensor.

11. The image-capturing module according to claim 9, wherein the light-emitting element is a light emitting diode.

* * * * *